H. A. STRATTON.
SHEAF LOADER.
APPLICATION FILED APR. 16, 1918.
1,301,192.
Patented Apr. 22, 1919.
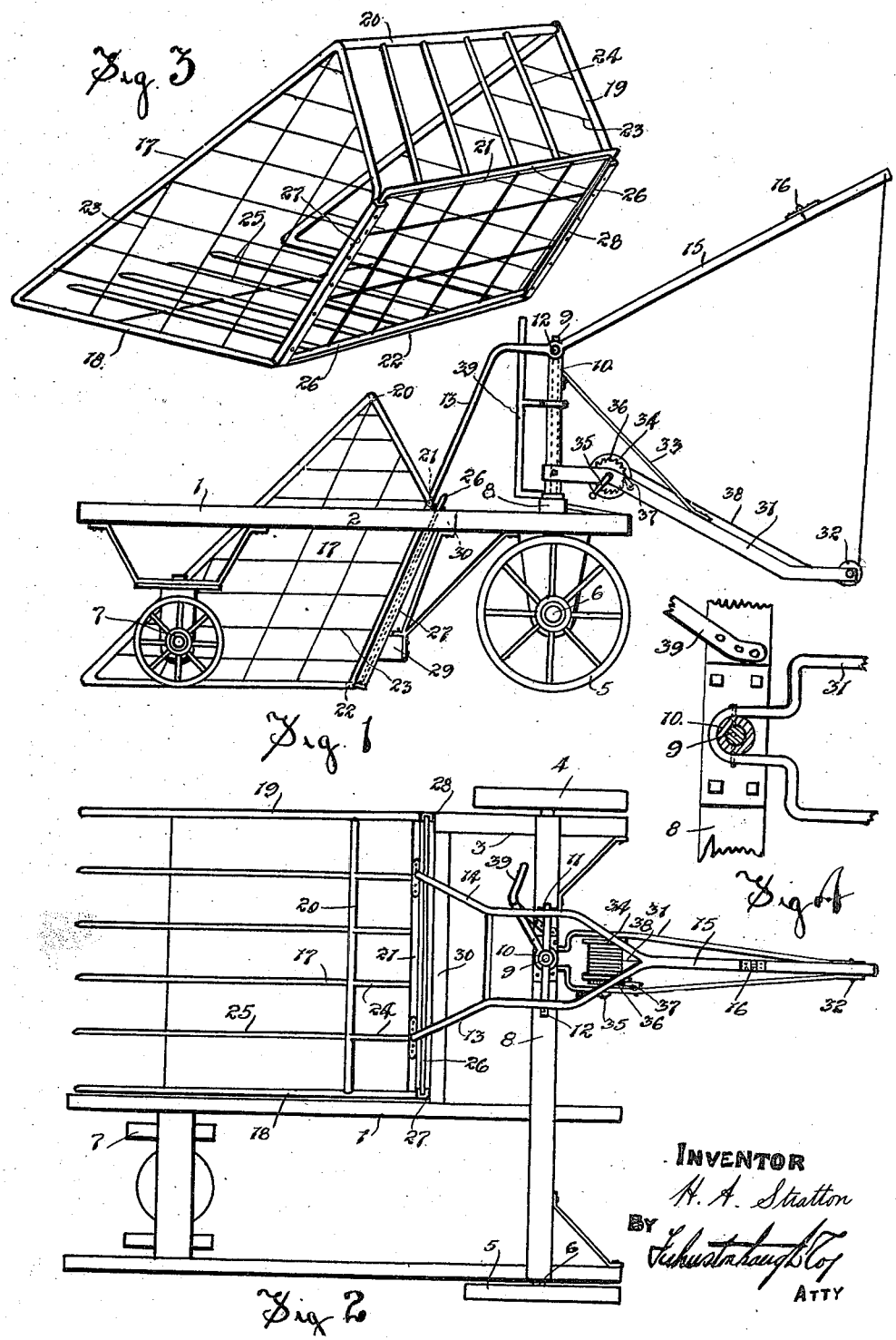

UNITED STATES PATENT OFFICE.

HENRY AUBREY STRATTON, OF MOOSE JAW, SASKATCHEWAN, CANADA.

SHEAF-LOADER.

1,301,192.  Specification of Letters Patent.  Patented Apr. 22, 1919.

Application filed April 16, 1918. Serial No. 228,949.

*To all whom it may concern:*

Be it known that I, HENRY AUBREY STRATTON, of the city of Moose Jaw, in the Province of Saskatchewan, Canada, have invented certain new and useful Improvements in Sheaf-Loaders, of which the following is the specification.

The invention relates to improvements in sheaf loaders and the object of the invention is to provide a simply constructed, easily operated machine of the above kind which can be drawn along the ground and will pick up or gather the sheaves presented to it to form a load and afterward can be readily dumped by first bodily raising and side swinging the load and afterward releasing the load while elevated to dump by gravity.

With the above object in view the invention consists essentially in a wheeled vehicle presenting a side frame having a lateral extension or rear carriage, a forked sweep or load receiver normally positioned to the side of the frame and pivotally connected to the carriage so that the same can be raised vertically and swung laterally, a draw gate formed as part of the sweep and means for raising the loaded sweep, the parts being arranged and constructed as hereinafter more particularly described and later pointed out in the appended claims, reference being had to the accompanying drawing in which:—

Figure 1 represents a side view of the complete machine.

Fig. 2 represents a plan view thereof.

Fig. 3 represents a detailed rear perspective view of the sweep.

Fig. 4 is a detached detail view.

In the drawing like characters of reference indicate corresponding parts in the several figures.

1 represents a wheeled vehicle presenting a side frame 2 and a rear carriage or lateral extension 3, the carriage and rear part of the frame being continuous and mounted on the rear wheels 4 and 5 located at the ends of the back axle 6, while the front end of the frame is mounted on the front pivoted truck 7. The frame is more or less rectangular, being formed from side and cross beams, while the carriage, which is also more or less rectangular in form, presents as one of its main elements a cross beam 8 positioned at right angles to the frame.

Centrally of the beam I locate an upright stationary centering post 9 on which I mount a sleeve 10 adapted to turn on the post. The upper end of the sleeve carries a diametrically opposing pair of pivot pins 11 and 12 on which I mount pivotally the forked forward ends 13 and 14 of a rearwardly extending operating lever 15. The rear end of the lever is fitted with a break joint as shown at 16 which allows the rearmost end thereof to turn upwardly but not downwardly.

As will be observed from the drawing the forked ends of the lever are deflected downwardly in a location somewhat in advance of the post and they form a support for the sweep 17 to which they are permanently secured.

The sweep is of an open frame construction comprising similar side frames 18 and 19 connected by cross members 20, 21 and 22. The side frames are closed in by cross wires 23 and the cross members 20 and 21 are connected by intervening rods 24. The bottom of the sweep is closed by forwardly extending forks 25 while the rear of it is normally closed by a gate 26 slidably mounted in suitable guides 27 and 28 secured to the back of the sweep.

While I have shown the sweep as constructed in a special way, it will be readily understood that I do not wish to be restricted to the precise construction shown. It is only necessary that it be light and of good capacity and be provided on the bottom side with forks or their equivalent and at the rear with a releasable gate.

In its normal position the sweep is adapted to butt the cross beams 29 and 30 when the forks are lying horizontally.

From the above disclosure it will be obvious that as the vehicle is drawn along the ground by draft animals hitched to the front truck the sweep will gather all the sheaves presented to it and that when a load is formed the attendant can raise the load and swing it to the side by pulling down the rear end of the lever.

To facilitate in manipulating the sweep I have provided a winding drum and cable to pull down the rear end of the lever and have provided a bracket to hold the load after it is raised. These parts are now described:—

31 represents a more or less A-shaped frame having the front end permanently secured to the sleeve 10 and the rear end fitted with a pulley 32 located in a position beneath the rear end of the lever. A brace rod 33 is interposed between the frame and the sleeve to render the structure more rigid. The A-frame carries a winding drum 34 supplied with a crank 35 and a ratchet wheel 36, the ratchet wheel being associated with a pivoted dog 37 carried by the A-frame. A cable 38 extends from the drum, passes around the pulley 32 and is attached to the rear end of the lever.

The bracket hereinbefore referred to is indicated at 39, and it is permanently mounted on the carriage and extends upwardly terminating in a location in advance of and above the upper end of the post. Further it is positioned so that after the load has been raised one can swing it to the side and rest the load on the bracket.

The loader is used as follows considering that the load to be dumped is dumped into a wagon accompanying the machine.

When the load has been gathered in the sweep the attendant winds up the drum to draw down the lever and elevate the sweep. He then swings the sweep laterally so that it will take a position above the wagon. Once it is brought to this position the gate is pulled back with the result that the load is free to drop through the then bottom of the sweep as it will be readily apparent that when the sweep is raised the gate will become the bottom of it for the time being with the result that as soon as the gate is pulled out the sheaves are dropped into the accompanying wagon rack.

From the above disclosure it will be clear that this machine can be manufactured at a reasonable cost and will be light and effective for the work for which it is designed.

While I have shown a winding drum for manipulating the lever, still it will be readily understood that this can be entirely dispensed with and the cable alone used, the cable being pulled down by the attendant at the rear.

What I claim as my invention is:—

1. In a sheaf loader, the combination with a wheeled frame having a lateral extension, of a sweep located to the side of the frame and in advance of the extension and mounted on the extension so that it can be raised vertically and swung laterally and a rest for the sweep in its elevated position.

2. In a sheaf loader, the combination with a wheeled frame having a lateral extension, of a load collecting sweep located to the side of the frame and in advance of the extension and provided on the ground side with forwardly extending gathering forks, a rearwardly extending lever permanently secured to the sweep and passing upwardy and over the extension, an elevated pivot connection securing the lever to the extension and constructed to allow of the raising and lateral swinging of the sweep in the manipulation of the lever and a gate at the rear side of the sweep in the load collecting position and adapted to be withdrawn in the elevated position of the sweep to release the load, means for drawing down the rear end of the lever and a bracket secured to the extension and adapted to act as a rest for the sweep in the elevated position thereof.

Signed at Moose Jaw, this 9th day of July 1917.

HENRY AUBREY STRATTON.

In the presence of—
ETHEL P. BOOTH,
J. W. CORMAN.

Copies of this patent may be obtained for five cents each, by addressing the "Commissioner of Patents, Washington, D. C."